US012694426B1

(12) United States Patent
Dwarakanathan et al.

(10) Patent No.: US 12,694,426 B1
(45) Date of Patent: Jul. 28, 2026

(54) RECOMMENDATION TECHNIQUES FOR TARGET EXECUTION

(71) Applicant: Amazon Technologies, Inc., Seattle, WA (US)

(72) Inventors: Srinivasan Dwarakanathan, Austin, TX (US); Hamza Riaz, Ontario (CA); Dustin Seth Gronso, Seattle, WA (US); Michael Ariaga, Pflugerville, TX (US)

(73) Assignee: Amazon Technologies, Inc., Seattle, WA (US)

( * ) Notice: Subject to any disclaimer, the term of this patent is extended or adjusted under 35 U.S.C. 154(b) by 1008 days.

(21) Appl. No.: 17/873,741

(22) Filed: Jul. 26, 2022

(51) Int. Cl.
*G06Q 30/0251* (2023.01)
*G06N 20/00* (2019.01)
*G06Q 30/0601* (2023.01)

(52) U.S. Cl.
CPC ......... G06Q 30/0264 (2013.01); G06N 20/00 (2019.01); G06Q 30/0631 (2013.01)

(58) Field of Classification Search
CPC . G06Q 30/0264; G06Q 30/0631; G06N 20/00
See application file for complete search history.

(56) References Cited

U.S. PATENT DOCUMENTS

| | | | |
|---|---|---|---|
| 10,936,258 B1 * | 3/2021 | Bradley | G06F 3/1222 |
| 2011/0066497 A1 * | 3/2011 | Gopinath | G06Q 30/02 |
| | | | 705/14.53 |
| 2013/0151332 A1 * | 6/2013 | Yan | G06Q 30/0243 |
| | | | 705/14.42 |
| 2017/0185946 A1 * | 6/2017 | Volkov | G06Q 10/063114 |
| 2019/0251593 A1 * | 8/2019 | Allouche | G06Q 10/0639 |
| 2020/0160373 A1 * | 5/2020 | Thimmaiah | G06Q 30/0246 |
| 2021/0118010 A1 * | 4/2021 | Landry | G06Q 30/0277 |
| 2022/0230240 A1 * | 7/2022 | Sliwka | G06Q 20/065 |
| 2022/0245710 A1 * | 8/2022 | Maheshwari | G06Q 30/0631 |
| 2023/0052423 A1 * | 2/2023 | Vijayan | G06Q 30/016 |

* cited by examiner

*Primary Examiner* — Beau D Spratt
(74) *Attorney, Agent, or Firm* — Kilpatrick Townsend & Stockton LLP

(57) ABSTRACT

Multi-modal techniques are described for identifying a recommendation corresponding to a system-defined target strategy. A machine-learning model configured to generate output data from input data may be trained or otherwise obtained. The machine-learning model being trained using an unsupervised machine-learning algorithm and a data set comprising a recurrent data instance, a historical user data instance, and a catalog data instance, to generate output data comprising one or more classification labels for the one or more data instances. Using those classification labels and underlying data, a recommendation for implementing a system-defined target strategy can be identified and presented at a user interface. Upon receiving user approval, a number of corresponding operations may be executed to implement the system-defined target strategy.

19 Claims, 10 Drawing Sheets

100

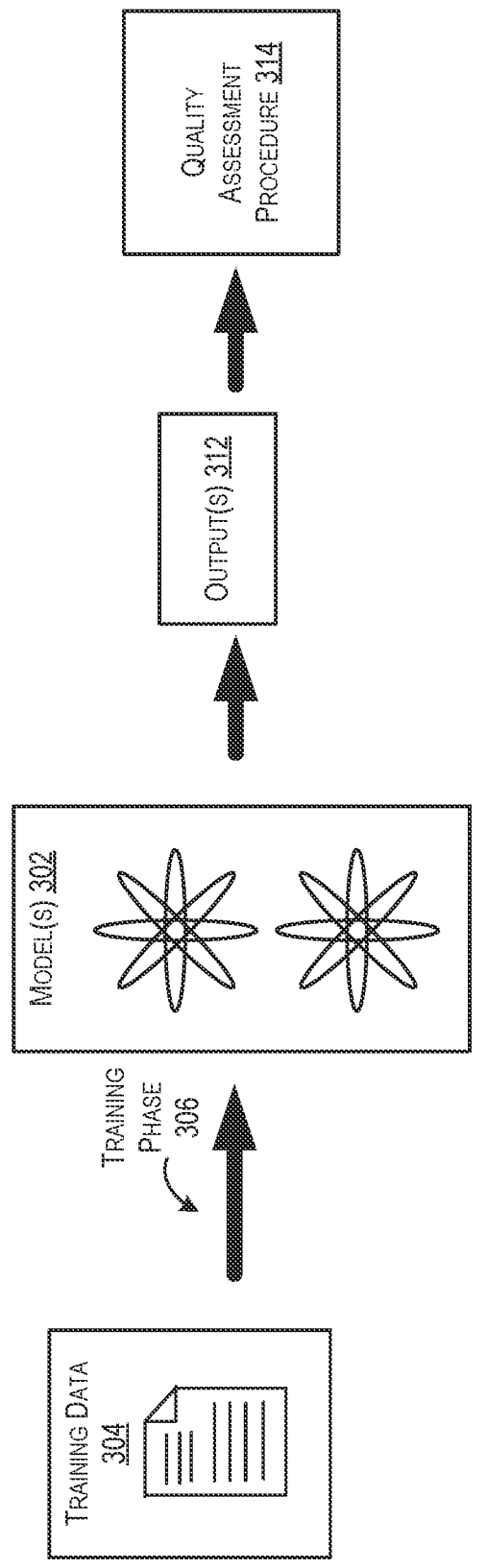
TRAINING DATA 304
TRAINING PHASE 306
MODEL(S) 302
OUTPUT(S) 312
QUALITY ASSESSMENT PROCEDURE 314
300
FIG. 3

Figure 6:
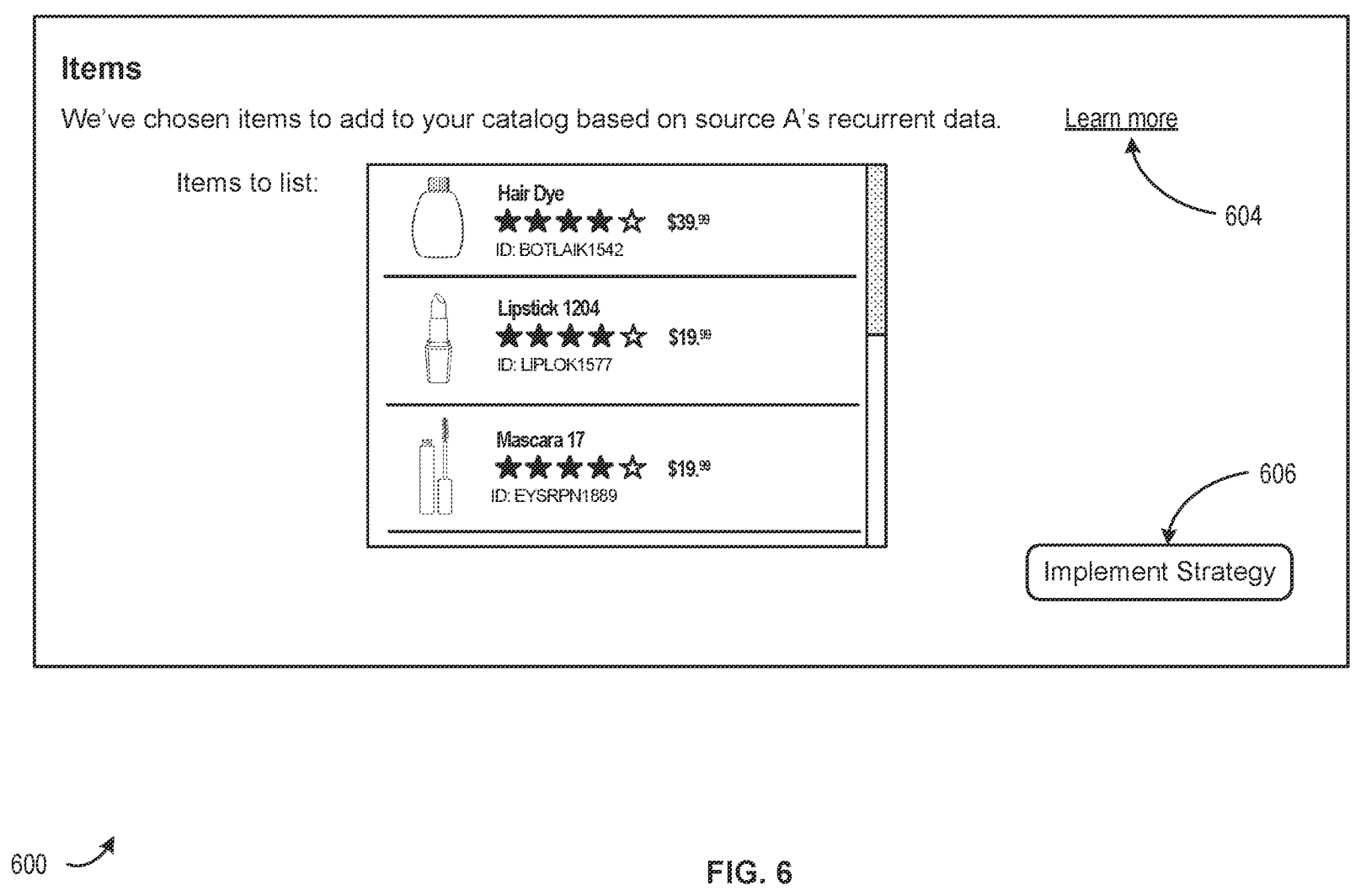

Items

We've chosen items to add to your catalog based on source A's recurrent data.    Learn more    _604_

Items to list:

Hair Dye
★★★★☆    $39.⁹⁹
ID: BOTLAK1542

Lipstick 1204
★★★★☆    $19.⁹⁹
ID: LIPLOK1577

Mascara 17
★★★★☆    $19.⁹⁹
ID: EYSRPN1889

_606_

Implement Strategy

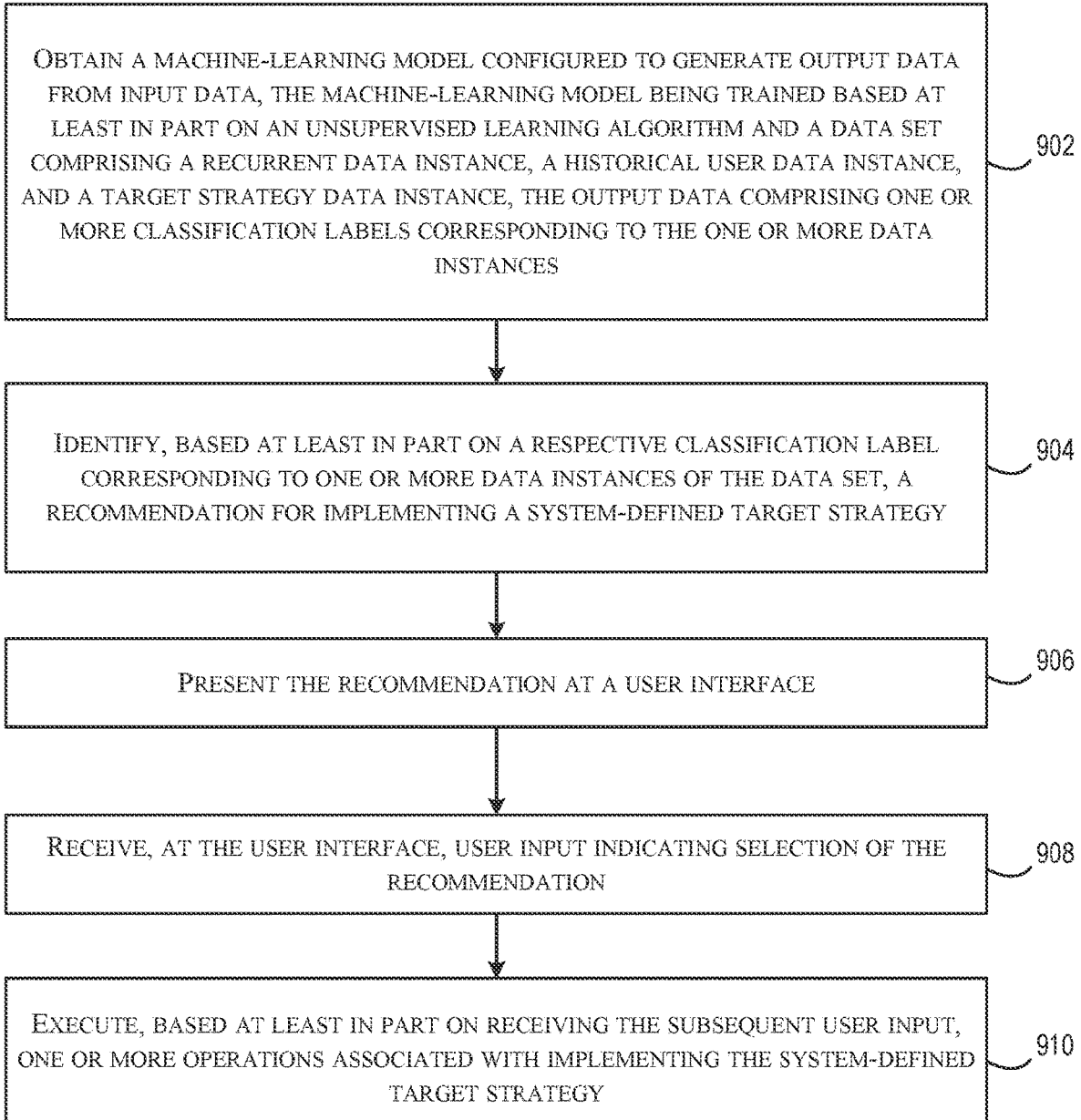

OBTAIN A MACHINE-LEARNING MODEL CONFIGURED TO GENERATE OUTPUT DATA FROM INPUT DATA, THE MACHINE-LEARNING MODEL BEING TRAINED BASED AT LEAST IN PART ON AN UNSUPERVISED LEARNING ALGORITHM AND A DATA SET COMPRISING A RECURRENT DATA INSTANCE, A HISTORICAL USER DATA INSTANCE, AND A TARGET STRATEGY DATA INSTANCE, THE OUTPUT DATA COMPRISING ONE OR MORE CLASSIFICATION LABELS CORRESPONDING TO THE ONE OR MORE DATA INSTANCES ⟋902

IDENTIFY, BASED AT LEAST IN PART ON A RESPECTIVE CLASSIFICATION LABEL CORRESPONDING TO ONE OR MORE DATA INSTANCES OF THE DATA SET, A RECOMMENDATION FOR IMPLEMENTING A SYSTEM-DEFINED TARGET STRATEGY ⟋904

PRESENT THE RECOMMENDATION AT A USER INTERFACE ⟋906

RECEIVE, AT THE USER INTERFACE, USER INPUT INDICATING SELECTION OF THE RECOMMENDATION ⟋908

EXECUTE, BASED AT LEAST IN PART ON RECEIVING THE SUBSEQUENT USER INPUT, ONE OR MORE OPERATIONS ASSOCIATED WITH IMPLEMENTING THE SYSTEM-DEFINED TARGET STRATEGY ⟋910

RECOMMENDATION TECHNIQUES FOR TARGET EXECUTION

BACKGROUND

It has become common for content providers to provider content on third-party websites. There can be various objectives for providing this content. The users requesting for content to be provided at third-party websites may not be experienced or knowledgeable in identifying actions that can further these objectives. Traditionally, the users would need special training and/or experience to make these types of identifications. Conventional techniques aimed at addressing this need utilize limited data that can lead to inaccurate determinations of various aspects of providing such content. This can result in a confused and frustrated user and an overall negative user experience. Improvements can be made to identify and execute actions that are more likely to achieve progress toward the user's performance targets.

BRIEF DESCRIPTION OF THE DRAWINGS

Various embodiments in accordance with the present disclosure will be described with reference to the drawings, in which:

FIG. 3 illustrates a flow for an example method for training one or more machine-learning models to classify input data, in accordance with at least one embodiment;

FIG. 6 illustrates another example user interface for reviewing and initiating a system-defined target strategy, in accordance with at least one embodiment.

FIG. 9 is a flowchart illustrating a method for identifying a recommendation for implementing a target strategy, in accordance with at least one embodiment.

DETAILED DESCRIPTION

Figure 1:
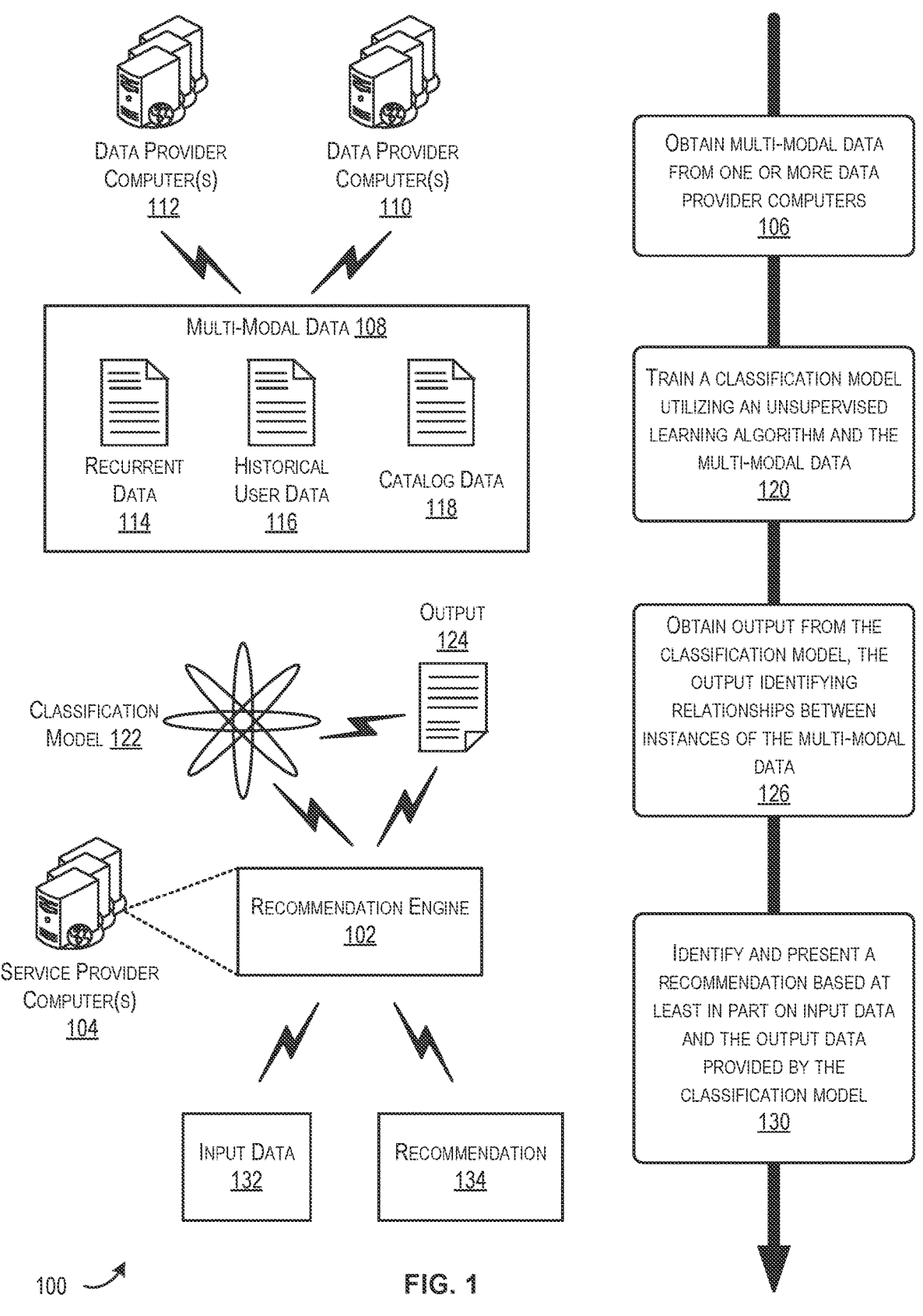
FIG. 1 is an example flow for implementing aspects of a recommendation engine, in accordance with at least one embodiment.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the processes described herein, or variations, and/or combinations thereof, may be performed under the control of one or more computer systems and/or devices configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

The techniques disclosed herein can generate, obtain, distribute, and/or manage various content on behalf of its users. In some embodiments, a system, method, or instructions for performing the techniques can provide users a self-service content generation, distribution, and management service. This content can be distributed by the system for eventual display at third-party websites. Users may lack adequate education or experience to identify which content would be most effective for progressing toward the user's desired target. As used herein, a "content target" is intended to refer to any suitable target associated with improving one or more metrics corresponding to content provided by a content provider on behalf of the user and/or corresponding to one or more webpages corresponding to content associated with the user. For example, a content target can be associated with increasing a number of instances particular content is presented at one or more third-party websites (also referred to as increasing the number of impressions), increasing interest or awareness of the user's offerings or brand, increasing user consideration or procurement, or the like. In some embodiments, content can be provided via any suitable third-party website. In some embodiments, the content may depict or otherwise provide information related a good and/or a service provided by an entity associated with the user. As a non-limiting example, the content may depict a particular item offered for consumption by the user at an online electronic catalog. Users may use the system to manage and define any suitable number of user-defined target strategies that identify one or more aspects of the substance of the content itself and/or the manner in which the content is distributed.

As another example, a content target may to one or more webpages corresponding to content associated with the user. By way of example, the user may wish to improve one or more metrics (e.g., increasing impressions, click-throughs, sales, etc.) corresponding to webpages that feature items offered by the user at an electronic catalog. Some of the target strategies discussed herein may relate to adding one or more items to the user's catalog to improve the targeted metric. The user may identify any suitable number of user-defined target strategies toward this end.

In some embodiments, the system may execute a recommendation engine that is configured to identify recommendations associated with future content distributions and/or content to be added to the user's electronic catalog. The recommendations engine may be used to identify one or more system-defined target strategies. By way of example, the system may collect multi-modal data (e.g., any suitable combination of recurrent data, historical user data, and catalog data) from a variety of data providers. The multi-modal data may be used with an unsupervised machine-learning algorithm to train one or more classification models to identify popular items and/or relationships between instances of the training data. The system may generate a recommendation for the user based at least in part on the output of the model. The recommendation may provide a system-defined target strategy that is directed to increasing one or more metrics corresponding to content to be distributed at third-party websites and/or items to be offered at an electronic catalog associated with the user. The attributes of the system-defined target strategy may identify an object (e.g., an item that will be featured in distributed content, an item that will be added to the user's electronic catalog, etc.). The user may use the system-defined target strategy to initiate one or more actions to progress toward the desired target metric.

As used herein, "recurrent data" is intended to refer to any suitable data that identifies information, topics, items, or entities that have been discussed, depicted, or otherwise presented at one or more websites. By way of example, one instance of recurrent data from a data provider computer may identify trending topics of a social media website. "Historical user data," as used herein, may include any suitable attribute related to one or more content targets and/or associated actions corresponding with other users of the system. As a non-limiting example, some users may be merchants that employ various target strategies (e.g., advertisement campaigns) to generate and distribute content (e.g., advertisements) that promote one or more items they offer at an electronic catalog. Historical user data may indicate any suitable attribute (e.g., start date, end date, items presented, etc.) of one or more historical advertising campaigns associated with other users of the system. In some embodiments, the historical user data corresponds to high-performing campaigns across the advertiser user base.

"Catalog data," as used herein, relates to one or more items offered at an electronic catalog and may be obtained from an electronic catalog provider (e.g., a system that hosts an electronic catalog for buyers and sellers). Each instance of catalog data may include any suitable attribute of an item offered for consumption at the electronic catalog such as item attributes (e.g., size, weight, price, etc.), sales data for the item (e.g., overall revenue, a number of sales over a time period, etc.), clickstream data (e.g., indicating user interface selections, clicks, purchases, etc. at a webpage associated with an item), presentation data (e.g., indicating a number of impressions or instances the webpage associated with the item was accessed or appeared in a search result list), or any suitable information associated with the item. In some embodiments, the disclosed recommendation system may be associated with an entity that also operates an electronic catalog from which the catalog data is obtained.

The recurrent data, historical user data, and catalog data may be utilized with an unsupervised machine-learning algorithm to train a model to identify a result set. The result set may indicate, among other things, a number of popular items that have been prominently featured and/or discussed across various third-party websites (e.g., social media websites), previous campaigns, and/or obtained and/or viewed at the electronic catalog. The system may be configured to generate a number of target strategies (e.g., advertising campaigns) directed to increasing one or more metrics (e.g., sales, impressions, click throughs, shopping cart adds, increased visits to an electronic or physical store, etc.) corresponding to content (e.g., advertisements) and/or items (e.g., items offered at an electronic marketplace) associated with the user. In some embodiments, the system may utilize aspects of the user's previous or active target strategies to identify recommendations from the output of the model. By way of example, if the user has various target strategies directed to increasing sales, the system may identify and present a recommendation to the user to add a number of popular/trendy items identified from the model's output to his catalog to increase his sales metric.

Utilizing the disclosed techniques alleviates the user from being required to have extensive experience or knowledge regarding content distribution. The output of the model(s) discussed herein may be updated at any suitable time or interval (e.g., every 10 minutes, every 15 minutes) to ensure that recommendations provided by the system are based on current trends and target items (e.g., items features in content such as advertisements, items provided via the user's electronic catalog, etc.) that are most likely to bring about the desired metric result. Conventional techniques for identifying objects (e.g., content, items, etc.) lack the wealth of data utilized by the disclosed system. For example, previous systems fail to use a combination of recurrent data, historical user data, and catalog data as described herein. This failure can cause inaccurate system determinations, leading to results that conflict with the user's objectives. By using the data and techniques described herein, the system more accurately identifies aspects (e.g., items) of potential target strategies over conventional systems. For example, the disclosed system can more accurately identify popular/trendy items to be featured in provided content and/or included in the user's catalog based at least in part on correlating, via the machine-learning model(s) discussed herein, top social media trends with current and/or popular items and high-performing campaigns across an advertiser user base.

Moving on to FIG. 1, which illustrates a flow 100 for implementing aspects of a recommendation engine, in accordance with at least one embodiment. The flow 100 may be executed by the recommendation engine 102. In some embodiments, recommendation engine 102 may operate as part of service provider computer(s) 104. Service provider computer(s) 104 may host, or interact with a separate computing system that hosts, a content manager (not depicted) that enables self-service content management (e.g., user-defined advertisement campaign management). In some embodiments, the recommendation engine 102 may operate as part of the content manager or otherwise communicate with the content manager to provide one or more recommendations via interfaces associated with the content manager. Any suitable reference to operations performed by the recommendation engine described herein may likewise be performed by the content manager hosted by the service provider computer(s) 104.

The flow 100 may begin at 106, where multi-modal data 108 may be obtained from one or more data provider computers (e.g., data provider computer(s) 110 and/or data provider computer(s) 112). Data provider computer(s) 110 and 112 may be any suitable computer or system configured to provide one or more instances of the multi-modal data 108. By way of example, data provider computer(s) 110 may be a third-party website (e.g., a social media website) that provides (e.g., based at least in part on receiving an application programming interface call) recurrent data 114. Recurrent data 114 may include data obtained from other data provider computer(s) different from 110. In some embodiments, data provider computer(s) 112 (e.g., data provider computer(s) associated with an entity such as an electronic catalog provider) may provide historical user data 116 and catalog data 118, while in other embodiments this data may be provided by data provider computers associated with different entities.

Multi-modal data 108 may include any suitable combination of recurrent data 114, historical user data 116, and catalog data 118. Recurrent data 114 may include any suitable data that identifies information, topics, items, or entities that have been discussed, depicted, or otherwise presented at one or more websites. By way of example, one instance of recurrent data from data provider computer(s) 110 may identify trending topics of a social media website. In some embodiments, recurrent data 114 may include any suitable number of instances collected from any suitable number of sources of which data provider computer(s) 110 is an example.

Historical user data 116 may include any suitable attribute related to one or more content targets and/or associated actions corresponding with other users of the system. As a non-limiting example, some users may be merchants that employ various target strategies (e.g., advertisement campaigns) to generate and distribute content (e.g., advertisements) that promote one or more items (e.g., items they offer at an electronic catalog). Historical user data 116 may indicate any suitable attribute (e.g., start date, end date, items presented, etc.) of one or more historical advertising campaigns associated with other users of the system. In some embodiments, the historical user data 116 corresponds to high-performing campaigns across the advertiser user base.

Each instance of catalog data 118 may include any suitable attribute of an item offered for consumption at the electronic catalog such as item attributes (e.g., size, weight, price, etc.), sales data for the item (e.g., overall revenue, a number of sales over a time period, etc.), clickstream data (e.g., indicating user interface selections, clicks, purchases, etc. at a webpage associated with an item), presentation data (e.g., indicating a number of impressions or instances the webpage associated with the item was accessed or appeared in a search result list), or any suitable information associated with the item.

In some embodiments, data provider computer(s) 110 and/or data provider computer(s) 112 or any suitable source of multi-modal data 108 may operate as part of the system in which service provider computer(s) 104 operate.

At 120, one or more classification models (e.g., classification model 122) may be trained to identify output 124 from input data. In some embodiments, the input data may include any suitable combination of the multi-modal data 108. The classification model(s) may be trained using any suitable unsupervised machine-learning algorithm including, but not limited to, k-means clustering, hierarchical clustering, convolutional neural networks, principal component analysis, DBSCAN clustering, and the like. Identification of output 124 may be formulated as an unsupervised multi-class classification problem where each class corresponds to an item and/or item category. The corresponding classification model may be trained to capture relationships between the features of the multi-modal data 108. In some embodiments, the classification model(s) may correlate (e.g., cluster) data instances related to objects (e.g., items) identified from recurrent data 114, objects from the catalog data 118 (e.g., items with views and/or purchases that exceed a predefined threshold), and/or objects identified from historical user data 116 (e.g., items previously included in high performing advertising campaigns. These correlations can be used to identify a set of items (or item categories or other attributes corresponding to those items) the correspond to any suitable number of recurrent data instances, historical user data instances, and/or catalog data instances.

At 126, output 124 may be obtained. In some embodiments, the system may be configured to retrain the classification model using newly obtained instances of multi-modal data 108 at any suitable time (e.g., according to a predefined schedule, frequency, etc.). By way of example, the classification model 122 may be trained every 15 minutes to generate output 124. This ensures that current information is used for output generation. In some embodiments, historical output instances of the classification model 122 may be stored. For example, the historical outputs of the classification model 122 generated in the past 24 hours, 2 weeks, 1 month, or one year may be stored.

At 130, the recommendation engine 102 may utilize input data 132 (e.g., data corresponding to one or more target strategies currently or previously being used by a given user) to identify, based at least in part on the output 124, a recommendation 134. By way of example, input data 132 may identify any suitable attributes (e.g., start date, end date, item(s), strategy type, allocation amount, etc.) of one or more target strategies previously initiated by a user. For example, a user may have previously defined a target strategy (e.g., related to an advertising campaign) to increase a particular metric (e.g., increase impressions) associated with content provided on behalf of the user (e.g., one or more advertisements for items offered by the user via an electronic catalog). Any suitable portion of the attributes and values corresponding to that target strategy may be utilized to identify a recommendation based at least in part on the output 124.

By way of example, the recommendation engine 102 may be configured to identify attributes for a new target strategy that also relates to increasing impressions (e.g., to coincide with the user's previous targeted metrics). To that end, the recommendation engine 102 may identify, from the output 124, data instances of the multi-modal data 108 that are related to one another. For example, the recommendation engine 102 may identify from output 124 a number of highly popular items and/or item categories (e.g., corresponding to items that have appeared or been discussed at social media websites (potentially multiple different social media websites)). In some embodiments, the classification model 122 may identify these items/categories as being highly popular due to recognizing that those items/categories are also utilized is over a threshold number of high performing campaigns, as identified from multiple related instances of historical user data 116. These items/categories may also be identified based at least in part on identifying that those items are viewed and/or procured over a threshold number of times or resulting in a threshold number of or amount in sales at an electronic catalog as identified from the catalog data 118.

In accordance with these determinations, the recommendation engine 102 may generate new target strategy attributes that correspond with any suitable portion of output 124 and/or any suitable portion of the instances of multi-modal data 108 that relate to the output 124. In some embodiments, one or more items and/or item categories corresponding to one or more entries of the output 124 may be included in the target strategy attributes. Any suitable portion (e.g., start time, end time, allocation amount, etc.) of attributes corresponding to one or more historical user data instances (e.g., of one or more highly performing campaigns that also included some number of those popular items/item categories) may be utilized for one or more of the target strategy attributes generated by the recommendation engine 102.

Once generated, the new target strategy may be presented as recommendation 134. The user may utilize the recommendation 134 presented to initiate creation and implementation of the target strategy associated with their account. In the ongoing example, a user may accept the recommendation 134 to cause the system to execute one or more operations to provide content on behalf of the user (e.g., advertisements) that features the one or more items (or items of the identified item categories) indicated in the target strategy attributes corresponding to recommendation 134.

The recommendation engine 102 may monitor or otherwise be configured to generate any suitable number of new recommendations at any suitable time (e.g., according to any suitable schedule, predefined frequency, etc.) based at least in part on one or more instances of output previously generated by the classification model 122. Therefore, the recommendations provided by recommendation engine 102 may vary as items and/or item categories gain or lose popularity such that the recommendations provided by recommendation engine 102 are more likely to bring about the desired result (e.g., an increase in the corresponding metric) of the identified target strategy.

Figure 2:
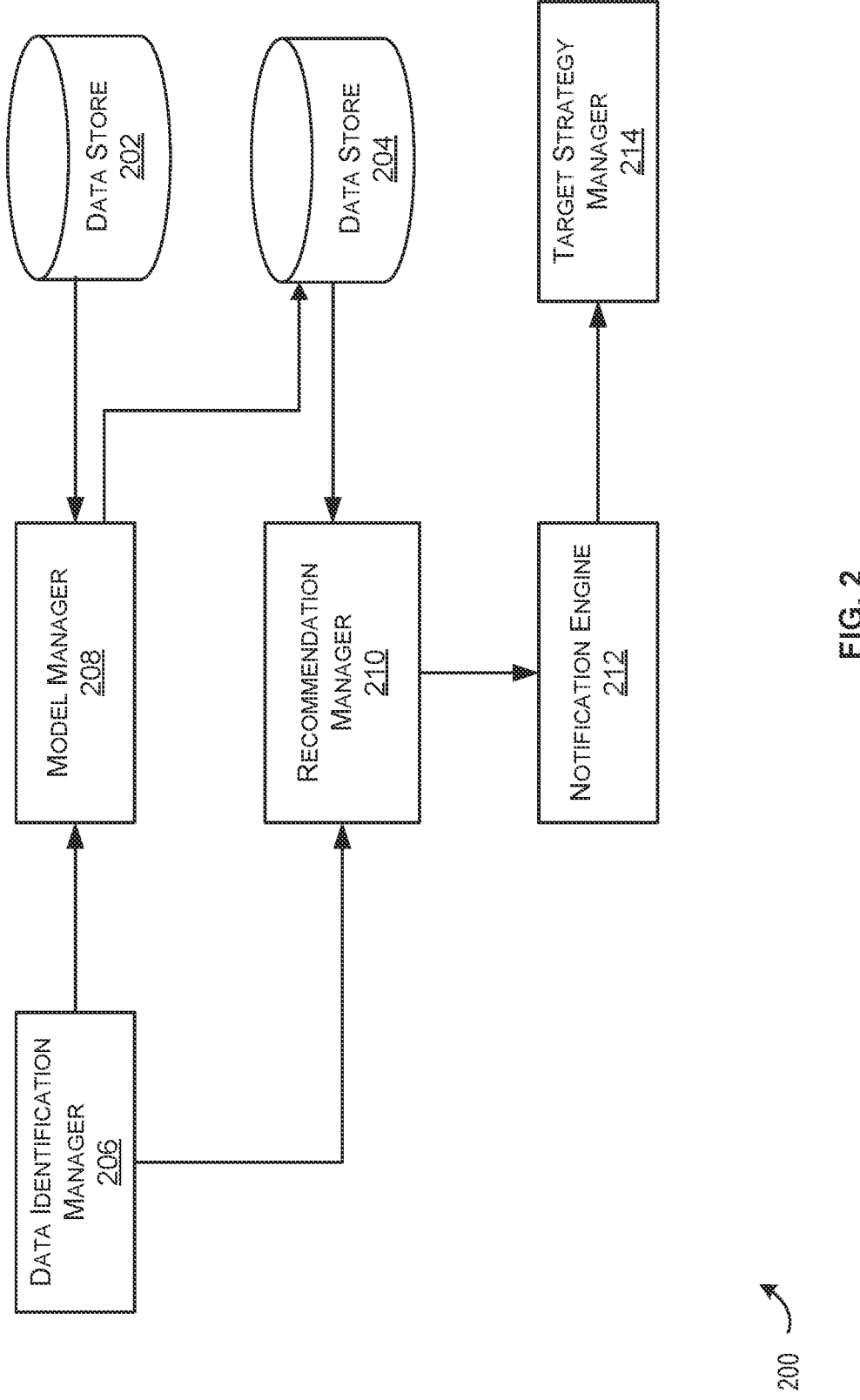
FIG. 2 is a block diagram illustrating an example computer architecture for a recommendation engine, in accordance with at least one embodiment.

FIG. 2 is a block diagram illustrating an example computer architecture for a recommendation engine 200 (e.g., the recommendation engine 102 of FIG. 1), in accordance with at least one embodiment. Recommendation engine 200 may include a plurality of modules that may perform functions in accordance with at least one embodiment. The modules may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for managing data of the type required to make corresponding calculations. The modules may exist as part of the recommendation engine 102 as part of the service provider computer(s) 104, or the modules may exist as separate modules or services external to the recommendation engine 102.

In the embodiment shown in the FIG. 2, data stores 202 and 204 are shown, although content data can be maintained, derived, or otherwise accessed from various data stores, either remote or local to the recommendation engine 200, to achieve the functions described herein. In at least one embodiment, the data stores described herein may be physically located on the service provider computer(s) 104 or alternatively, any suitable combination of the data stores may be operated separate from the service provider computer(s) 104. The recommendation engine 200, as shown in FIG. 2, includes various modules such as data identification manager 206, model manager 208, recommendation manager 210, notification engine 212, and target strategy manager 214. Some functions of the modules are described below. However, for the benefit of the reader, a brief, non-limiting description of each of the modules is provided in the following paragraphs. In accordance with at least one embodiment, a process is identifying potential feature combinations for a new item.

In at least one embodiment, the recommendation engine 200 includes the data identification manager 206. The data identification manager 206 may be configured to collect or otherwise obtain any suitable number of data instances (e.g., instances of multi-modal data 108 of FIG. 1) from any suitable number of sources (e.g., data provider computer(s) 110 and/or 112 of FIG. 1). For example, the data identification manager 206 may be configured to obtain instances of recurrent data (e.g., recurrent data 114) from these sources at any suitable time, according to any suitable schedule or frequency, and/or based on user request (e.g., via any suitable user interface provided by the recommendation engine 200 such as those discussed below with respect to target strategy manager 214). Sources of the data instances obtained by the data identification manager 206 may include any suitable combination of social media websites, new websites, item review websites, and the like.

In some embodiments, data identification manager 206 may be configured to execute feature extraction operations. By way of example, the data obtained by the data identification manager 206 may be in differing formats and/or include different data attributes and/or values. As a non-limiting example, the data obtained by the data identification manager 206 may include hashtags, keywords, category types, keyword or topic searches, tags, and the like. In some embodiments, the data obtained by the data identification manager 206 may be normalized to convert and/or reformat the data into a common form for processing. The data identification manager 206 may execute any suitable features extraction process configured to transform the data obtained by the data identification manager 206 into numerical features while preserving the information of the original data. The feature extraction operations performed by the data identification manager 206 may increase the training and inference speed of the model(s) trained by model manager 208 by reducing the dimensionality of the data (e.g., by removing redundant data). By way of example only, the data identification manager 206 may utilize principal component analysis or another suitable feature extraction method to reduce the dimensionality of the data while preserving as much statistical varying information as possible. Principal component analysis identifies new variables from the data by solving an eigenvalue/eigenvector problem.

In some embodiments, the data identification manager 206 may be configured to store or otherwise maintain a history of the data collected from the data provider computer(s). For instance, the data identification manager 206 could store the last week's collected data. In some cases, the data identification manager 206 may be configured to determine whether a particular item or item category has been consistently popular based on the obtained data. It may be the case that the data identification manager 206 will not forward features of an item and/or item category to the model manager 208 unless it can determine that the item and/or item category has appeared in the data its obtained over a threshold number of times (e.g., over 100 times, etc.), across a threshold number of sources (e.g., at 4 or more sources, etc.), or for at least a threshold time period (e.g., the last 24 hours). Although not depicted, the data identification manager 206 may obtain catalog data from the data store 202 to identify whether the item and/or item category has historical purchase history that corroborates the item and/or item category as being one that is popular. By way of example, the data identification manager 206 may forward features of the data collected only when the historical purchase history corresponding to the item and/or item category exceeds a predefined threshold or has experience a predefined amount of increase in a predefined period of time.

In at least one embodiment, the recommendation engine 200 includes the model manager 208. The model manager 208 may be configured to train any suitable number of models to obtain and/or receive recurrent data from data identification manager 206. The model manager 208 may also access data store 202 to obtain addition training data. By way of example, data store 202 may be a storage location from which any suitable combination of historical user data (e.g., historical user data 116 of FIG. 1) and/or catalog data (e.g., catalog data 118 of FIG. 1) may be obtained.

The model manager 208 may generate a training set including any suitable data obtained from the data identification manager 206 and/or the data store 202. The model manager 208 may train and/or retrain a model utilizing the training set and any suitable machine-learning techniques (e.g., an unsupervised machine-learning algorithm). By way of example, the model manager 208 may utilize any suitable combination of: a k-means clustering algorithm, a hierarchical clustering algorithm, a convolutional neural network, a DBSCAN clustering algorithm, or the like. The training data may be provided to the utilized algorithm as input to generate an output (e.g., output 124 of FIG. 1). The training may be formulated as an unsupervised multi-class classification problem where each class corresponds to an item and/or item category. The corresponding classification model may be trained to capture relationships between the features of the data obtained from the data identification manager 206 and/or the data store 202 (e.g., multi-modal data 108 of FIG. 1). Example operations for training the model(s) is discussed in further detail below in connection with FIG. 3. The model manager 208 may be configured to train/retrain the model(s) according to a predefined schedule and/or frequency. By way of example, the model manager 208 may train the model(s) every 15 minutes to generate new output.

The output(s) generated by the model may be stored in data store 204 for subsequent use. Data store 204 may be a storage location accessible the model manager 208. In some embodiments, data store 204 is part of the service provider computer(s) 104, while in other embodiments, the data store 204 is separate but accessible to the service provider computer(s) 104.

In at least one embodiment, the recommendation engine 200 includes the recommendation manager 210. Recommendation engine 102 may be configured to generate one or more recommendations based at least in part on data obtained from data store 204 (e.g., the output generated by the model(s) trained by model manager 208. In some embodiments, recommendation engine 102 may be configured to identify any suitable attributes (e.g., start date, end date, item(s), strategy type, allocation amount, etc.) of one or more target strategies previously initiated by a particular user. The recommendation engine 102 may generate any suitable number of recommendations from the data of data store 204. In some embodiments, the recommendation engine 102 may factor in the attributes of a particular user's previous target strategies when identifying one or more recommendations (e.g., to identify recommendations that coincide with the user's previous target strategies/targeted metrics). For example, a user may have previously defined a target strategy (e.g., related to an advertising campaign) to increase a particular metric (e.g., to increase impressions, to increase awareness, to increase sales, etc.) associated with content provided on behalf of the user (e.g., one or more advertisements for items offered by the user via an electronic catalog) and/or items offered by the users (e.g., items offered by the user in an electronic catalog). Any suitable portion of these attributes and corresponding values may be used to identify recommendations for the user.

By way of example, the recommendation manager 210 may be configured to identify attributes for a new target strategy that also relates to increasing impressions (e.g., to coincide with the user's previous target strategies/targeted metrics) and/or sales. To that end, the recommendation manager 210 may identify, from the data store in data store 204, a number of highly popular items and/or item categories (e.g., corresponding to items that have appeared or been discussed at social media websites (potentially multiple different social media websites)). In some embodiments, the classification model 122 may identify these items/categories as being highly popular due to recognizing that those items/categories are also utilized is over a threshold number of high performing campaigns, as identified from multiple related instances of historical user data 116. These items/categories may also be identified based at least in part on identifying that those items are viewed and/or procured over a threshold number of times or resulting in a threshold number of or amount in sales at an electronic catalog as identified from the catalog data 118. Data instances corresponding to any suitable number of historical user data instances, catalog data instances, and/or recurrent data instances may share a common classification. In some embodiments, the recommendation manager 210 may utilize data instances having the same classification to identify any suitable number of attributes for a recommendation (e.g., a recommendation of a new target strategy).

Any suitable number of recommendations generated by the recommendation manager 210 may be provided at any suitable time to the notification engine 212. Notification engine 212 may be configured to format the recommendation attributes according to any suitable predefined format and/or template. In some embodiments, the notification engine 212 may transmit a notification including the recommendation (reformatted or otherwise) to the target strategy manager 214. The target strategy manager 214 may be configured to host any suitable number of user interfaces (e.g., the user interfaces discussed below in connection with FIGS. 4-7) to provide users options to manage one or more of their corresponding target strategies. In some embodiments, the notification received from the notification engine 212 may be presented at one or more user interfaces. A more detailed description of this notification is discussed below in connection with FIG. 4.

FIG. 3 illustrates a flow for an example method 300 for training one or more machine-learning models (e.g., classification model 122 of FIG. 1) to classify input data (e.g., training data 306), in accordance with at least one embodiment. The method 300 may be performed by the service provider computer(s) 104 of FIG. 1 or another system or service separate from but accessible to the service provider computer(s) 104. In some embodiments, method 300 may be performed by the recommendation engine 102 of FIG. 1 operating at the service provider computer(s) 104 (of which recommendation engine 200 of FIG. 2 is an example).

As discussed above, training data 304 may include any suitable portion of the multi-modal data 108 of FIG. 1, including any suitable number of data instances of recurrent data 114, historical user data 116, and/or catalog data 118 of FIG. 1. During training phase 306, the training data 304 is provided as input to an unsupervised machine-learning algorithm (e.g., a k-means clustering algorithm, an autoencoder algorithm, hierarchical clustering, etc.). Each piece of data is an unlabeled input object or sample. The model(s) 302 (e.g., the classification model 122 of FIG. 1) may be configured to learn relationships between the data instances. In some embodiments, the data instances may be clustered together in any suitable number of clusters. In some embodiments, the goal of the training phase 304 is to seek out similarities in the data instances at to group similar instances together. The output(s) 312 (an example of the output 124 of FIG. 1) may indicate classifications for each data instance that indicate the groups of data instances. In some embodiments, the classifications (e.g., classification labels) identified for the output(s) 312 may be ranked based at least in part on generating a score corresponding to a set of data instances associated with each classification. By way of example, a classification label corresponding to each classification may be ranked based at least in part on a number of data instances associated with the label, where classification labels that are associated with a greater number of data instances are ranked higher than other classification labels that are associated with fewer data instances.

In some embodiments, quality assessment procedure 314 may be executed to identify a degree of accuracy with respect to the classifications identified in output(s) 312. In some embodiments, at least part of the quality assessment procedure 314 includes computing a similarity measure (e.g., a rand index, an adjusted rand index, etc.) between two different clusterings by considering all pairs of samples and counting pairs that are assigned in the same or different clusters. The similarity measure may quantify the frequency of agreements of the total pairs (or the probability that two clusterings will agree on a randomly chosen pair). In some embodiments, if the similarity measure exceeds a predefined threshold, the model(s) 302 may be deemed to be accurate and may be utilized by the recommendation engine 102 (e.g., by the model manager 208 of FIG. 2) to identify classifications for new input.

The method 300 may be performed any suitable number of times at any suitable interval and/or according to any suitable schedule such that the accuracy of the model(s) 302 are improved over time and provide up-to-date output based on current multi-modal data.

Figure 4:
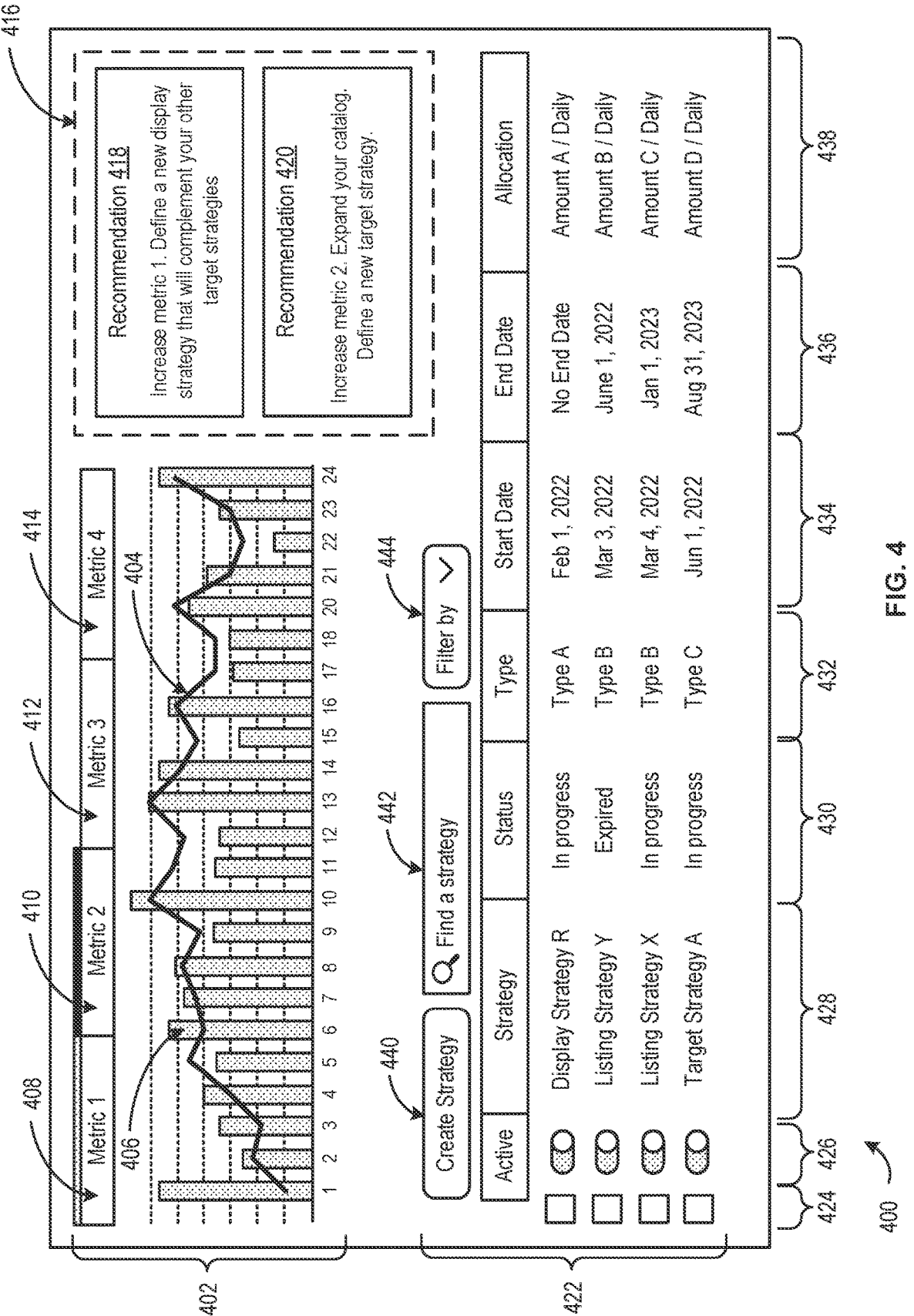
FIG. 4 illustrates an example user interface for presenting recommendations and initiating new target strategies, in accordance with at least one embodiment.

FIG. 4 illustrates an example user interface 400 for presenting recommendations and initiating new target strategies, in accordance with at least one embodiment. As depicted, user interface 400 includes metric viewing area 402. Metric viewing area may be configured to present any suitable number of metrics via any suitable number of data representations (e.g., via bar graphs, pie charts, charts, and the like). As depicted, these data representations (e.g., a bar graph 406 and a line 404) may be charted on a same set of axes. In some embodiments, the user may select any suitable option (e.g., tab 408, tab 410, table 412, tab 414, etc.) to select or deselect a metric for presentation at metric viewing area 402.

User interface 400 may include notification area 416. In some embodiments, notification area 416 may be utilized (e.g., by the target strategy manager 214 of FIG. 2) to present any suitable notification to the user. In some embodiments, at least one of these notifications may include a recommendation generated by a recommendation engine (e.g., the recommendation engine 102 of FIG. 1, the recommendation engine 200 of FIG. 2, etc.). As depicted, notification area 416 presents recommendation 418 and recommendation 420. Recommendation 418 depicts an example of a recommendation that is directed to increasing a first metric (e.g., increasing a number of impressions, that is, page views of the user's item detail pages (e.g., webpages used to offer an item for consumption at an electronic catalog)). Recommendation 420 depicts an example of a recommendation that is directed to increasing a second metric (e.g., increasing a number or an amount corresponding to sales of an item offered by the user at an electronic catalog).

User interface 400 may include target strategy management area 422. Target strategy management area 422 may be utilized to provide any suitable combination of target strategy attributes and corresponding values related to the user's historical target strategies. As a non-limiting example, target strategy management area 422 may include any suitable combination of data and/or graphical elements 424-438. For example, graphical elements 424 may be used to select one or more target strategies (e.g., for deletion or another action). Graphical elements 426 may be used to toggle on/off a respective target strategy. Toggling off the target strategy may cause the operations associated with that strategy to be paused. For example, toggling off a target strategy that includes sending content (e.g., advertisements) on behalf of the user to increase a particular metric (e.g., impressions, awareness, etc.) may include ceasing transmission of that content for as long as the toggle is off for that target strategy. To resume those transmissions, the user may toggle the respective graphical element 426 to the on position.

Target strategy management area 422 may include strategy identifiers 428 corresponding to any suitable number of target strategies, status indicators 430, type indicators 432, start dates 434, end dates 436, and/or allocations 438. Strategy identifiers 428 may include any suitable number of identifiers that individually uniquely identify a particular target strategy. Status indicators 430 may indicate any suitable status (e.g., in progress, expired, cancelled, etc.) corresponding to an individual target strategy. The status may indicate whether the operations corresponding to that strategy are currently being executed. Type indicators 432 may include any suitable information that identifies a type corresponding to the target strategy. For example, a type may indicate the type of target (e.g., to increase sales, to increase impressions, to increase awareness, to increase confidence, and the like). Start dates 434 and end dates 436 may indicate a respective start and end date for each target strategy displayed in target strategy management area 422. Allocations 438 may correspond to a budget or allotment assigned to a respective target strategy. In some embodiments, target strategy management area 422 may present any suitable number of target strategies previously defined and initiated by the user (e.g., using option 440 to access a user interface for creating a new target strategy) and/or by the system (e.g., target strategies generated by the system and approved by the user via the recommendations of notification area 416). Options 442 and 444 may be utilized to search (e.g., by keyword) and filter, respectively, the target strategy data corresponding to the target strategies presented via target strategy management area 422.

The recommendations presented within notification area 416 may be presented for a predefined period of time and/or the recommendations may be replaced and/or modified (e.g., by the notification engine 212 of FIG. 2) at any suitable time. In some embodiments, a single recommendation corresponding to a given type of target strategy may be displayed at any given time. For example, recommendations 418 and 420 may be presented together in some embodiments because they are directed to different types of target strategies (e.g., an increase to metric 1 versus an increase to metric 2). However, a new recommendation directed to increasing metric 1 may be used to replace recommendation 418 at any suitable time.

For the purposes of the ongoing example, recommendation 418 may be an example of a recommendation for increasing impressions (e.g., webpage views of an item detail page (e.g., a webpage that features the item) corresponding to an item offered by the user at an electronic catalog). Recommendation 420 for the purposes of this example may be an example of a recommendation for increasing sales for the user (e.g., overall, or with respect to a particular item offered by the user at an electronic marketplace).

Figure 5:
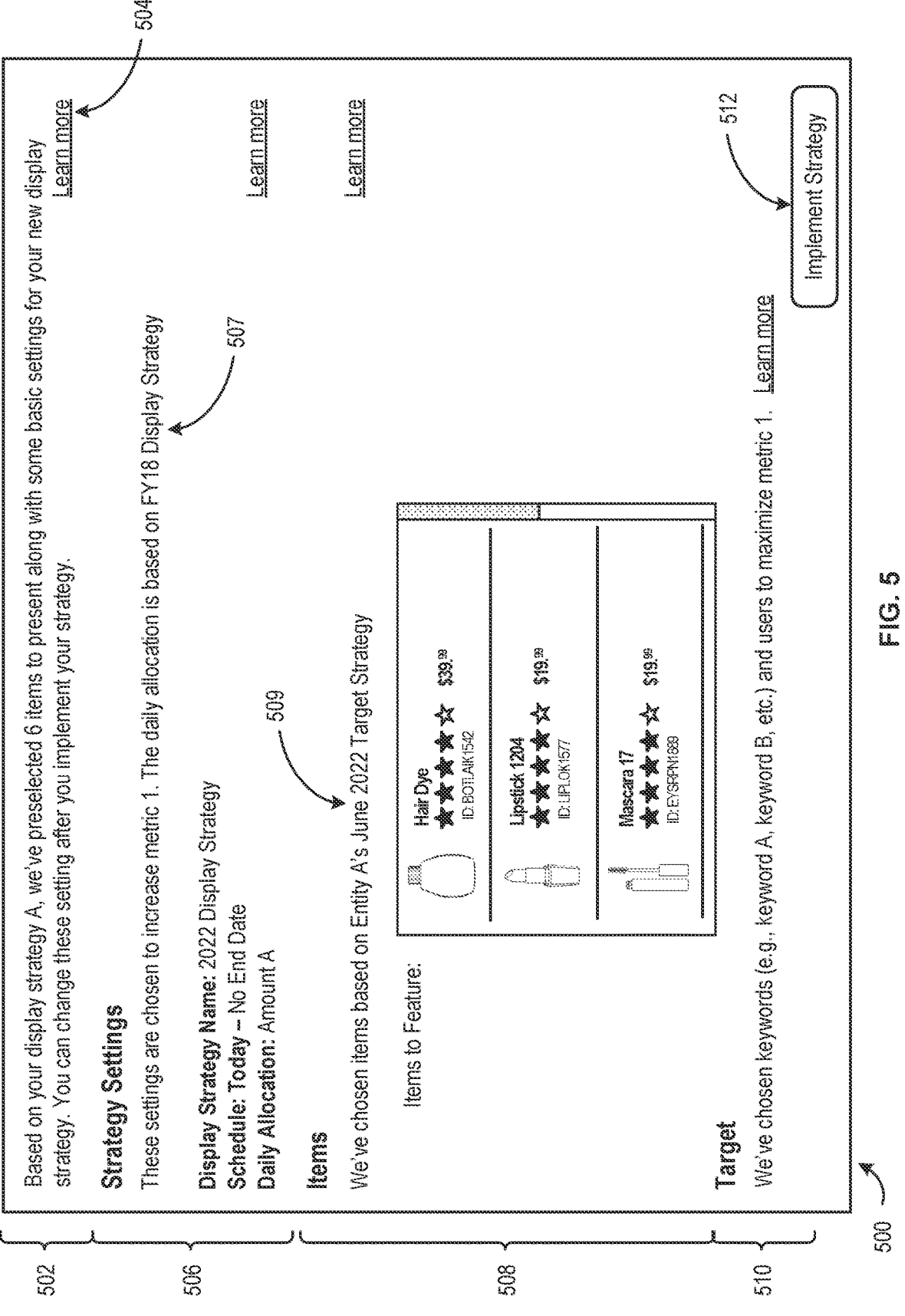
FIG. 5 illustrates an example user interface for reviewing and initiating a system-defined target strategy, in accordance with at least one embodiment.

FIG. 5 illustrates an example user interface 500 for reviewing and initiating a system-defined target strategy, in accordance with at least one embodiment. In some embodiments, user interface 500 may be presented in response to receiving user input at user interface 400 indicating the selection of recommendation 418.

User interface 500 may include information section 502. Information section 502 may be formatted to include any suitable information data associated with the selected recommendation. In some embodiments, information section 502 may introduce and/or explain context for the data provided in sections 506-510. In some embodiments, the information section 502 may include hyperlink 504 that, if selected, may present the user with additional information regarding the recommendation 418 (e.g., how it was identified (based on one or more of the user's previous target strategies such as display strategy A of FIG. 4), what the target is of the target strategy presented via user interface 500, and the like. As depicted, any suitable number of sections 506-510 may include a corresponding hyperlink that may be selected to be presented with additional information that further describes the data presented in that section.

In some embodiments, section 506 may include any suitable object strategy attributes generated by the system. By way of example, a target strategy name (e.g., "2022 Display Strategy"), a start and/or end date (e.g., a current day indicated by "today" and no end date indicated by "no end date"), an allocation (e.g., a daily allocation such as allocation A). In some embodiments, an allocation indicated within section 506 may indicate an amount of a particular currency (e.g., $20 U.S. dollars, etc.). In some embodiments, section 506 may indicate one or more data instances of multi-modal data 108 of FIG. 1 from which one or more target strategy attributes were determined. For example, an indication may be presented at 507 that the target strategy attributes of section 506 were identified based at least in part on a display strategy entitled "FY18 Display Strategy." If multiple historic target strategies were used to identify the attributes of section 506, they too may be presented with section 506 to inform the user of the data used to generate the attributes of section 506.

In some embodiments, section 508 may identify any suitable number of items. These items may correspond to item already offered by the user via an electronic marketplace. In some embodiments, an indication may be presented at 509 that the items of section 508 were identified based at least in part on particular historical user data (e.g., another user's target strategy entitled "Entity A's June 2022 Campaign"). If multiple instances of historical user data were used to identify the items of section 506, they too may be presented within section 508 to inform the user of the data used to identify the items of section 508.

In some embodiments, section 510 may identify any suitable number of additional target strategy attributes not identified within sections 506 and/or 508. These attributes may correspond keywords and/or user attributes corresponding to users to whom content (e.g., advertisements) featuring the items of section 508 are to be presented and/or targeted.

If the user agrees with the information presented via user interface 500, he may select button 512 to generate a target strategy instance corresponding to the data provided via user interface 500. The target strategy instance generated may be referred to as a "system-defined target strategy" as the attributes corresponding to the strategy were defined by the system rather than the user. Selecting button 512 may navigate the user back to user interface 400. An entry corresponding to the system-defined target strategy may soon thereafter appear in target strategy management area 422 of FIG. 4.

FIG. 6 illustrates another example user interface 600 for reviewing and initiating a system-defined target strategy, in accordance with at least one embodiment. In some embodiments, user interface 600 may be presented in response to receiving user input at user interface 400 indicating the selection of recommendation 420.

User interface 600 may present data corresponding to any suitable number of items (e.g., hair dye, lipstick, mascara, etc.). These items may correspond to items selected by the recommendation engine (e.g., the recommendation engine 102), that are not currently offered by the user via an electronic marketplace. In some embodiments, an indication may be presented at 602 that the items of user interface 600 were identified based at least in part on particular recurrent data (e.g., data indicating these particular items were mentioned over a threshold number of times at one or more social media websites). If multiple instances of historical user data were used to identify the items, they too may be presented within with user interface 600 to inform the user of the data used to identify the items of section 508. A hyperlink (e.g., hyperlink 604) or another navigational element may be presented via user interface 600. Hyperlink 604, when selected, may present the user with additional information regarding how the items presented via user interface 600 were selected.

If the user agrees with the information presented via user interface 600, he may select button 606 to generate a target strategy instance corresponding to the data provided via user interface 600. The target strategy instance generated may be referred to as a "system-defined target strategy" as the attributes corresponding to the strategy were defined by the system rather than the user. Selecting button 606 may navigate the user back to user interface 400 of FIG. 4. An entry corresponding to this system-defined target strategy may soon thereafter appear in target strategy management area 422 of FIG. 4.

Figure 7:
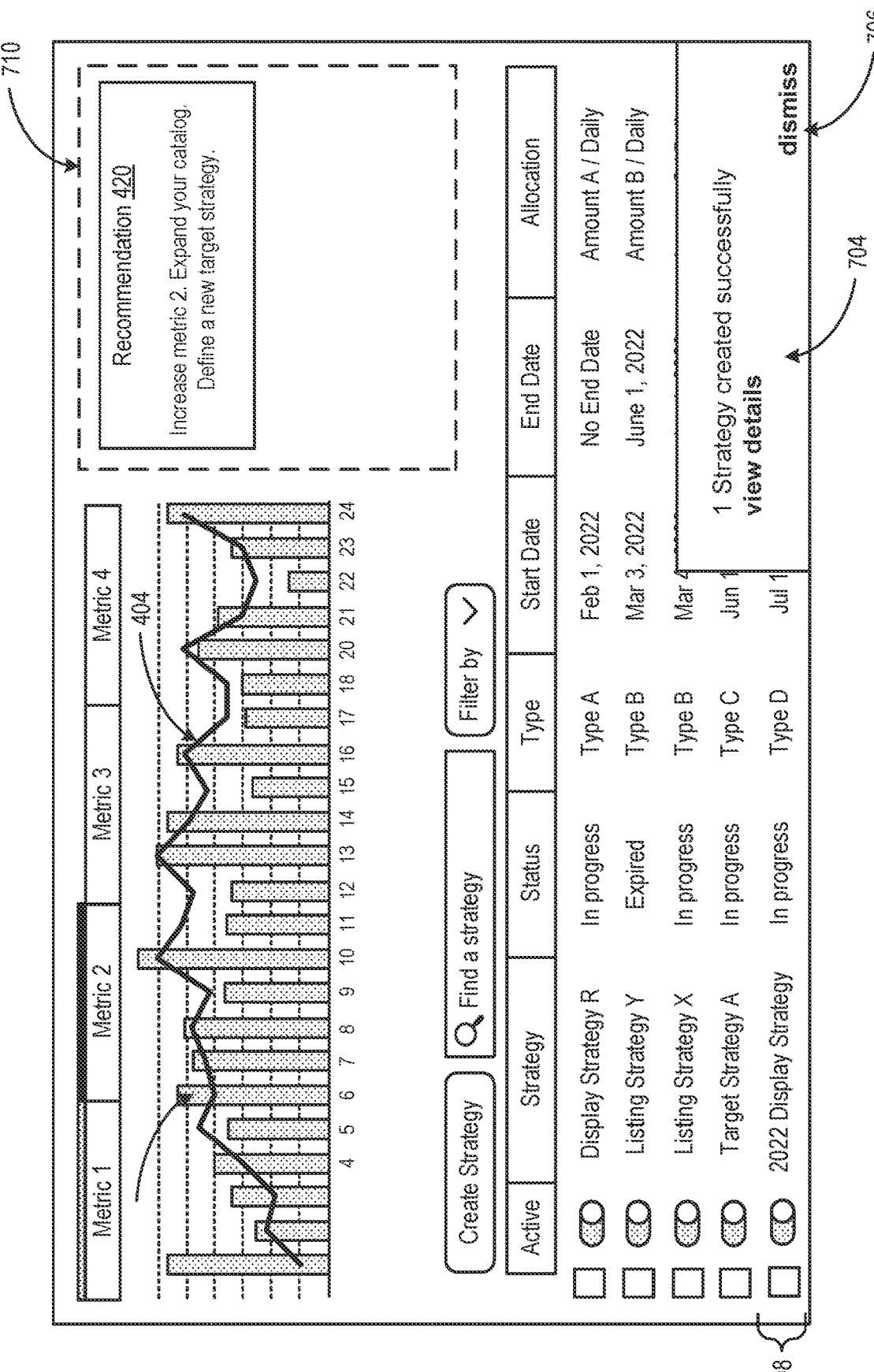
FIG. 7 illustrates example interface elements for indicating a status of initiating a new target strategy, in accordance with at least one embodiment.

FIG. 7 illustrates example interface elements for indicating a status of initiating a new target strategy, in accordance with at least one embodiment. By way of example, user interface 700 may be an example of the user interface 400 of FIG. 4. In some embodiments, user interface 700 may include display element 704 that indicates a target strategy has been created successfully. In some embodiments, display element 704 may be presented after the user has selected either button 512 of FIG. 5 or button 606 of FIG. 6. The display element 704 may time out and disappear after a predefined period, or the user may select option 706 to dismiss/delete the display element 704.

In the scenario in which the user selected button 606, entry 708 (e.g., corresponding to the recommendation 418 of FIG. 4 and the user interface 500 of FIG. 5) may be presented within the target strategy management area (e.g., the target strategy management area 422 of FIG. 4) as depicted in FIG. 7. In some embodiments, the notification area 710 (an example of the notification area 416 of FIG. 4) may be updated to remove recommendation 418. Similar operations could be performed were the user to select the button 606 of FIG. 6.

Figure 8:
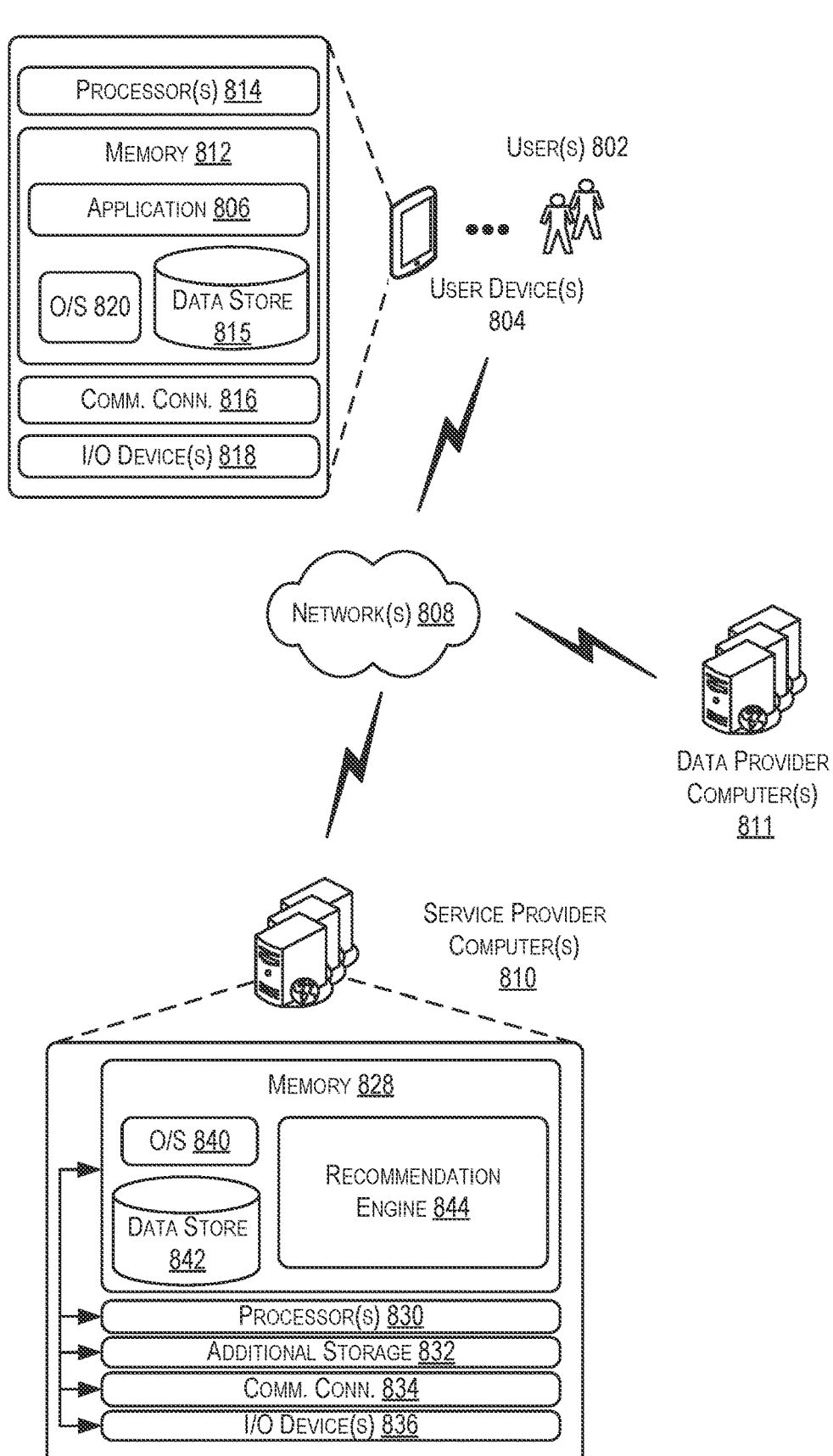
FIG. 8 illustrates components of a recommendation system according to a particular embodiment.

FIG. 8 illustrates components of a recommendation system according to a particular embodiment. In system 800, one or more users 802 may utilize a user device (e.g., a user device of a collection of user devices 804) to navigate to a network page provided by the service provider computer(s) 810 view and/or modify any suitable number of target strategies associated with a corresponding user account. For example, the user may access a user interface accessible through an application 806 (e.g., the user interfaces of FIGS. 4-7) running on the user devices 804 via one or more networks 808. In some embodiments, the application 606 may be a web browser (e.g., any suitable software application that is configured to access data on the World Wide Web/the Internet). The application 806 operating on the user devices 804 may be hosted, managed, and/or provided by a computing resources service or service provider, such as by utilizing one or more service provider computer(s) 810. In some embodiments, In some examples, the networks 808 may include any one or a combination of many different types of networks, such as cable networks, the Internet, wireless networks, cellular networks, and other private and/or public networks. While the illustrated example represents the users 802 accessing application functionality over the networks 808, the described techniques may equally apply in instances where the users 802 interact with the service provider computer(s) 810 via the one or more user devices 804 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 806 may allow the users 802 to interact with the service provider computer(s) 810 to provide the various functionality described above. For example, a user may utilize the application 806 to manage and/or provide various attributes of user-defined target strategies, receive recommendations for new system-defined target strategies, initiate new target strategies from the recommendations provided, and the like. Each target strategy, whether user-defined or system-defined, may be associated with a corresponding set of actions intended to bring about an improvement in one or more metrics corresponding to content (e.g., digital advertisements) provided by the user (e.g., a content provider, such as an advertiser of goods and/or services).

The service provider computer(s) 810, perhaps arranged in a cluster of servers or as a server farm, may host the application 806 operating on the user devices 804 and/or cloud-based software services. Other server architectures may also be used to host the application 806 and/or cloud-based software services. The application 806 operating on the user devices 804 may be capable of handling requests from the users 802 and serving, in response, various user interfaces that can be rendered at the user devices 804. The application 806 operating on the user devices 804 can present any suitable type of website that supports user interaction. The described techniques can similarly be implemented outside of the application 806, such as with other applications running on the user devices 804.

In some embodiments, the service provider computer(s) 810 may be configured to operate as a content provider. For example, the service provider computer(s) 810 may generate and provide various content such as advertisements to any suitable number of third-party websites via the network(s) 808 (e.g., the Internet). Service provider computer(s) 810 may be associated with an electronic catalog provider. The service provider computer(s) 810 can host (or be communicatively connected to computers that host) websites that enables presentation and procurement of various goods and/or services. The service provider computer(s) 810 can store or otherwise access and/or request historical user data (such as historical campaign information and attributes) corresponding to one or more users of the system (e.g., other advertisers that utilize the system). In some embodiments, the service provider computer(s) 810 may be configured to request and/or receive data from any suitable number of data provider computer(s) 811.

Data provider computer(s) 811 (e.g., an example of the data provider computers of FIG. 1) may be associated with any suitable number of third-party websites (e.g., social media websites, news websites, etc.) from which recurrent data may be generated. In some embodiments, the recurrent data from each data provider computer may identify one or more prominent topics appearing or discussed at a third-party website (e.g., a social media website). As a non-limiting example, recurrent data associated with a third-party website may identify one or more social media trends (e.g., topics, keywords, items, or the like that are discussed and/or appear at a third-party website over a threshold number of times, or potentially by a threshold number of users, in a predefined time window). Data provider computer(s) 811 and service provider computer(s) 810 may communicate via any suitable communication connection (e.g., communication connections 834) and/or using any suitable interface such as one or more application programming interfaces.

The user devices 804 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 804 may be in communication with the service provider computer(s) 810 via the networks 808, or via other network connections.

In one illustrative configuration, the user devices 804 may include at least one memory 812 and one or more processing units (or processor(s)) 814. The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described.

The memory 812 may store program instructions that are loadable and executable on the processor(s) 814, as well as data generated during the execution of these programs. Depending on the configuration and type of user computing device, the memory 812 may be volatile (such as random-access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 812 may include multiple different types of memory, such as static random-access memory (SRAM), dynamic random-access memory (DRAM), or ROM.

Turning to the contents of the memory 812 in more detail, the memory 812 may include an operating system 820, one or more data stores 815, and one or more application programs, modules, or services. The application 806 may be configured to receive, store, and/or display a network page or other interface for interacting with the service provider computer(s) 810. Additionally, the memory 812 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 804 may also contain communications connection(s) 816 that allow the user devices 804 to communicate with a stored database, another computing device or server (e.g., the service provider computer(s) 810), user terminals and/or other devices on the networks 708. The user devices 804 may also include I/O device(s) 818, such as a keyboard, a mouse, a pen, a voice input device, a touch input device, a display, speakers, a printer, etc.

The service provider computer(s) 810 and the data provider computer(s) 811 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 810 and/or the data provider computer(s) 811 are executed by one more virtual machines that may be implemented in a hosted computing environment. The hosted computing environment may include one or more rapidly provisioned and released computing resources, which computing resources may include computing, networking and/or storage devices. A hosted computing environment may also be referred to as a cloud-computing environment. The service provider computer(s) 810 and the data provider computer(s) 811 may separately include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 810 may include at least one memory 828 and one or more processing units (or processor(s)) 830. The processor(s) 830 may be implemented as appropriate in hardware, computer-executable instructions, firmware, or combinations thereof. Computer-executable instruction or firmware implementations of the processor(s) 830 may include computer-executable or machine-executable instructions written in any suitable programming language to perform the various functions described.

The memory 828 may store program instructions that are loadable and executable on the processor(s) 830, as well as data generated during the execution of these programs. Depending on the configuration and type of service provider computer(s) 810, the memory 828 may be volatile (such as RAM) and/or non-volatile (such as ROM, flash memory, etc.). The service provider computer(s) 810 or servers may also include additional storage 832, which may include removable storage and/or non-removable storage. The additional storage 832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 828 may include multiple different types of memory, such as SRAM, DRAM, or ROM.

The memory 828, the additional storage 832, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 828 and the additional storage 832 are all examples of computer storage media. Additional types of computer storage media that may be present in the service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 810 may also contain communications connection(s) 834 that allow the service provider computer(s) 810 to communicate with a stored database, another computing device or server, user terminals and/or other devices on the networks 808. The service provider computer(s) 810 may also include I/O device(s) 836, such as a keyboard, a mouse, a pen, a voice input device, a touch input device, a display, speakers, a printer, etc.

Turning to the contents of the memory 828 in more detail, the memory 828 may include an operating system 840, one or more data stores 842, and/or one or more application programs, modules, or services for implementing the features disclosed herein, such as the features provided by the recommendation engine 844 (an example of the recommendation engine 102 of FIG. 1). In some embodiments, the recommendation engine 844 may be configured to execute operations corresponding to the 300 of FIG. 3, to train one or more classification models as discussed above. In some embodiments, the recommendation engine 844 may include the components discussed in connection with architecture 200 of FIG. 2 to perform the operations discussed therein. The recommendation engine 844 may utilize the techniques described in the above figures to identify one or more recommendations for new system-defined target strategies (e.g., to increase one or more metrics based at least in part on providing identified content to third-party websites).

FIG. 9 is a flowchart illustrating another example method 900 for identifying a recommendation for implementing a target strategy (e.g., the recommendation engine 102 and 844 of FIGS. 1 and 8, respectively), in accordance with at least one embodiment. A non-transitory computer-readable storage medium may store computer-executable instructions that, when executed by at least one processor, cause at least one computer to perform instructions comprising the operations of the method 900. It should be appreciated that the operations of the method 900 may be performed in any suitable, not necessarily the order depicted in FIG. 9. Further, the method 900 may include additional, or fewer operations than those depicted in FIG. 9. The operations of method 900 may be performed by the recommendation engine 944 of FIG. 9. In some embodiments, the recommendation engine 902 may execute on service provider computer(s) 710 of FIG. 7.

The method 900 may begin at 902, where a machine-learning model configured to generate output data from input data may be obtained. In some embodiments, the machine-learning model is trained based at least in part on an unsupervised machine-learning algorithm and a data set comprising a recurrent data instance, a historical user data instance, and a catalog data instance. In some embodiments, the output data comprises one or more classification labels corresponding to the one or more data instances. In some embodiments, the recommendation engine (e.g., recommendation engine 102 of FIG. 1, recommendation engine 200 of FIG. 2, etc.) may be configured to train the machine-learning model, or the machine-learning model may be trained by a system or computer separate from the one hosting the recommendation engine.

At 904, a recommendation for implementing a system-defined target strategy may be identified. In some embodiments, the recommendation may be identified based at least in part on a respective classification label corresponding to one or more data instances of the data set. By way of example, a classification label may be associated with a particular set of recurrent data instances, historical user data instances, and catalog data instances. The collective data instances may be associated with the same classification label based at least in part on identifying, by the model, that there is a degree of similarity between those data instances. In some embodiments, the recurrent data instances indicate topics or items exceeding some degree of prominence and/or popularity at one or more third-party websites (e.g., social media websites, news websites, etc.). In some embodiments the recurrent data instances are received from various third-party data providers and indicating one or more trending topics at one or more social media websites. Some of the recurrent data instances may be associated with the same classification as catalog data instances for items that have exceeded a threshold number of sales or threshold number of sales. In some embodiments, the same classification label may be assigned to historical user data comprising attributes (e.g., target strategy attributes such as those presented at 424-438 of FIG. 4) and/or impressions or sales data (e.g., indicating a number and/or history of views of the corresponding user's webpages, indication a number or amount of sales, etc.) corresponding to user-defined target strategies associated with other users.

At 906, the recommendation may be presented at a user interface. The recommendation may be an example of recommendations 418 and/or 420 of FIG. 4. In some embodiments, the recommendation may be presented at the user interface (e.g., user interface 400 of FIG. 4) within a notification area (e.g., notification area 416 of FIG. 4). The recommendation may relate to recommending a system-defined target strategy to the user. In some embodiments, the attributes of the system-defined target strategy may be identified from any suitable portion of the data instances associated with a given classification label (e.g., a classification label associated with popular items, high selling items, high-performing campaigns, and the like). In some embodiments, attributes corresponding to the user's previously defined target strategies (e.g., target strategies previously defined by the user), may be used to identify a recommendation that coincides (e.g., concerns the same metric and/or target/objective) as one or more of the user's previous target strategies.

At 908, user input may be received at the user interface (e.g., user interface 400). In some embodiments, the user input may indicate selection of the recommendation. By way of example, the user may select recommendation 418 of FIG. 4. In some embodiments, this selection may cause user interface 500 of FIG. 5 to be presented to the user. The user may approve the implementation of the system-defined target strategy indicated via user interface 500 by selecting an option similar to the button 512 of FIG. 5.

At 910, one or more operations associated with implementing the system-defined target strategy may be executed based at least in part on receiving the subsequent user input. For example, in response to receiving an indication that button 512 was selected, the recommendation engine may pass the attributes corresponding to the recommendation to a target strategy manager (e.g., the target strategy manager 214 of FIG. 2) to generate a target strategy with those attributes. Various operations may then be performed to implement the corresponding target strategy. By way of example, any suitable number of content instances (e.g., advertisements) may be presented by the system on behalf of the user and in accordance with the attributes of the target strategy. As a non-limiting example, the content may begin being presented on a start date indicated by the attributes associated with the system-defined target strategy. The content may continue to be presented on behalf of the user until an end date is reached that corresponding with the attributes associated with the system-defined target strategy. In some embodiments, the number of content instances presented may increase until an allocation amount is reached that corresponds to an allocation amount associated with the attributes of the system-defined target strategy. By way of example, if each presentation of content costs $0.15 and the allocation amount is $1.00, the content may be presented 6 times. In some embodiments, the allocation amount corresponds to a time window (e.g., daily) and the system may present additional content instances when the time window elapses. For example, the allocation of $1.00 may correspond to a single day. On the following day, the content instance may be presented an additional six times.

Figure 10:
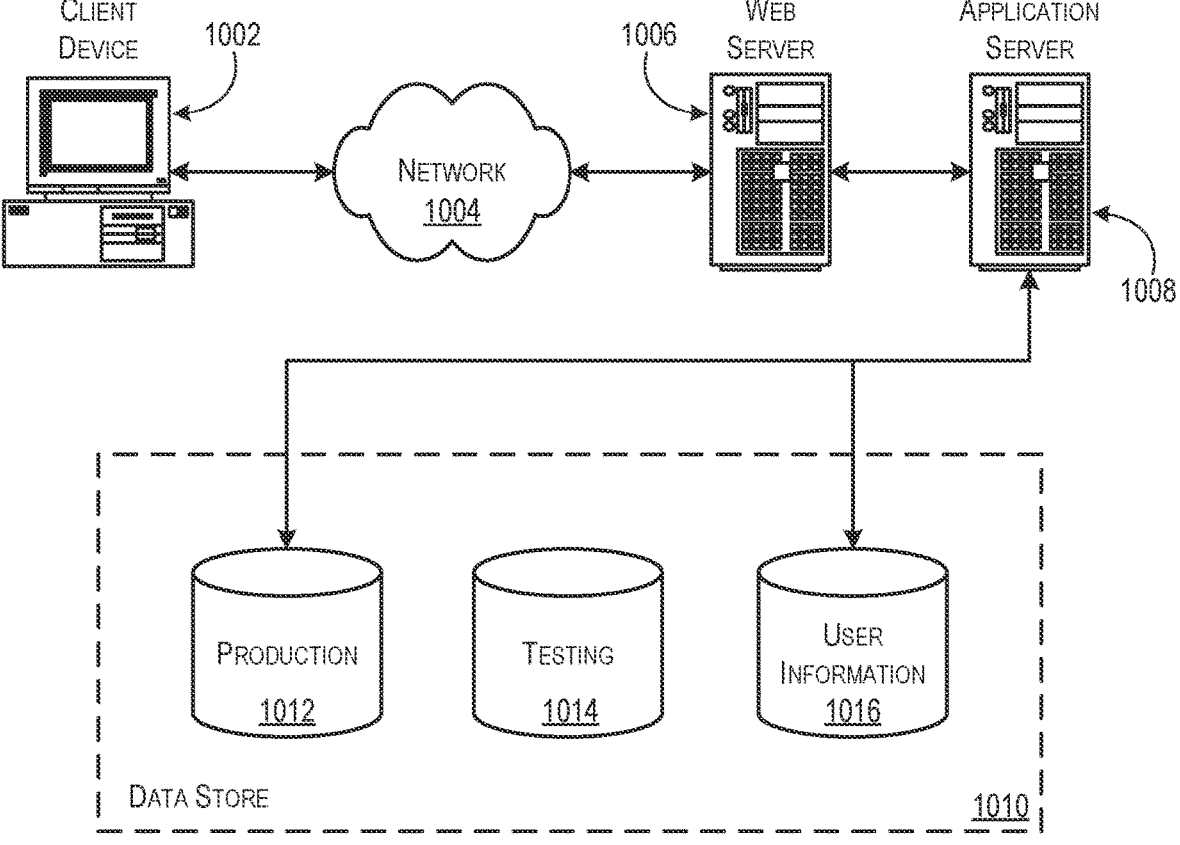
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   training, by a computing system, a machine-learning model to generate output data from input data, the machine-learning model being trained to assign a classification label that indicates a threshold degree of similarity between data instances, the machine-learning model being trained based at least in part on an unsupervised machine-learning algorithm and a training data set including data instances comprising a recurrent data instance that indicates a first set of items that were historically presented at a third-party website, a historical user data instance that indicated a second set of items that are associated with a historical target strategy, and a catalog data instance that indicates a metric corresponding to a third set of items that were previously provided at an electronic catalog, the output data comprising a respective classification label corresponding to a subset of the data instances of the training data set;

receiving, by the computing system, subsequent input data associated with a user account, the user account being associated with a seller of items, the input data comprising attributes of one or more user-defined target strategies;

identifying, based at least in part on the classification label being assigned by the machine-learning model to the subsequent input data and one or more data instances, a recommendation for implementing a system-defined target strategy, the recommendation being associated with adding an item to a catalog that is associated with the seller or featuring the item in subsequent content, the item being selected from one or more items indicated by the one or more data instances that correspond to the classification label;

presenting the recommendation at a user interface;

receiving, at the user interface, user input indicating selection of the recommendation;

presenting, via a second user interface, one or more attributes corresponding to the system-defined target strategy, the one or more attributes identifying the item;

receiving subsequent user input indicating a selection of an option corresponding to the second user interface; and executing, by the computing system based at least in part on receiving the subsequent user input, one or more operations associated with implementing the system-defined target strategy.

2. The computer-implemented method of claim 1, wherein the classification label is one of a plurality of classification labels.

3. The computer-implemented method of claim 1, wherein the recurrent data instance corresponds to data that identifies recurrent topics occurring at one or more third-party websites.

4. The computer-implemented method of claim 1, wherein the historical user data instance includes corresponding attributes associated with a previously known target strategy associated with a second user.

5. The computer-implemented method of claim 4, wherein the one or more attributes of the system-defined target strategy are identified from the previously known target strategy based at least in part on identifying a respective metric corresponding to the previously known target strategy exceeds a predefined threshold.

6. The computer-implemented method of claim 1, wherein the catalog data instance comprises corresponding attributes associated with the third set of items.

7. The computer-implemented method of claim 1, wherein the one or more operations comprise at least one of: 1) presenting content featuring a first item identified from the output data generated by the machine-learning model or 2) adding a second item to the electronic catalog on behalf of an entity corresponding to the user account.

8. A computing device, comprising
one or more processors; and
one or more memories comprising computer-readable instructions that, when executed by the one or more processors, causes the computing device to:
obtain a machine-learning model configured to generate output data from input data, the machine-learning model being trained to assign a classification label that indicates a threshold degree of similarity between data instances based at least in part on an unsupervised machine-learning algorithm and a training data set comprising a recurrent data instance that identifies a first item historically presented at a third-party website, a historical user data instance that identifies a second item that is associated with a historical target strategy, and a catalog data instance that identifies a metric corresponding to a third item that was previously provided in an electronic catalog, the output data comprising a respective classification label corresponding to a subset of the data instances of the data set;

receive subsequent input data associated with a user account, the user account being associated with a seller of items, the input data comprising attributes of one or more user-defined target strategies;

identify, based at least in part on the classification label being assigned by the machine-learning model to the subsequent input data and one or more data instances of the data set, a recommendation for implementing a system-defined target strategy, the recommendation being associated with adding an item to a catalog that is associated with the seller or featuring the item in subsequent content, the item being selected from one or more items indicated by the one or more data instances that correspond to the classification label;

present the recommendation at a user interface;

receive, at the user interface, user input indicating selection of the recommendation; and execute, based at least in part on receiving subsequent user input, one or more operations associated with implementing the system-defined target strategy.

9. The computing device of claim 8, wherein executing the instructions further causes the computing device to:
present, via a second user interface, one or more system-defined attributes corresponding to the system-defined target strategy; and
receive additional user input indicating a selection of an option corresponding to the second user interface, wherein the one or more operations are executed further based at least in part on receiving the additional user input.

10. The computing device of claim 8, wherein the recurrent data instance is associated with a social media website and a topic occurring over a threshold number of times at the social media website.

11. The computing device of claim 8, wherein the historical user data instance corresponds to high-performing user account associated with a service provider.

12. The computing device of claim 11, wherein the service provider hosts the electronic catalog comprising the catalog data instance.

13. The computing device of claim 8, wherein the one or more classification labels are ranked based at least in part on generating a score corresponding to a set of data instances associated with each classification label of the one or more classification labels.

14. A non-transitory computer-readable storage medium comprising computer-readable instructions that, when executed by one or more processors of a computing device, cause the computing device to:
train a machine-learning model to generate output data from input data, the machine-learning model being trained to assign a classification label that indicates a threshold degree of similarity between data instances based at least in part on an unsupervised machine-learning algorithm and a training data set, the training data set comprising a recurrent data instance that identifies a first item that was historically presented at a third-party website, a historical user data instance that identifies a second item that is associated with a historical target strategy, and a catalog data instance that identifies a metric corresponding to a third item that was previously provided at an electronic catalog, the output data comprising a respective classification label corresponding to a subset of data instances of the training data set;

obtain historical target strategy data corresponding to one or more previously implemented and user-defined target strategies associated with a user account corresponding to a seller of items;

identify, based at least in part on the classification label being assigned by the machine-learning model to one or more data instances of the data set and the historical target strategy data, a recommendation for implementing a system-defined target strategy, the recommendation being associated with adding an item to a catalog that is associated with the seller or featuring the item in subsequent content, the item being selected from one or more items indicated by the one or more data instances that correspond to the classification label;

present the recommendation at a user interface;

receive, at the user interface, user input indicating selection of the recommendation; and execute, based at least in part on receiving subsequent user input, one or more operations associated with implementing the system-defined target strategy.

15. The non-transitory computer-readable storage medium of claim 14, wherein at least one classification label is associated with at least one recurrent data instance, at least one historical user data instance, and at least one target strategy data instance.

16. The non-transitory computer-readable storage medium of claim 14, wherein the recurrent data instance, the historical user data instance, and the catalog data instance are obtained from one or more data provider computers.

17. The non-transitory computer-readable storage medium of claim 16, wherein the one or more data provider computers are associated with different entities.

18. The non-transitory computer-readable storage medium of claim 14, wherein the unsupervised machine-learning algorithm comprises a clustering algorithm configured to identify relationships between data instances of the input data.

19. The non-transitory computer-readable storage medium of claim 14, wherein executing the instructions further causes the computing device to:

compute one or more similarity measures between data instances of different classification labels; and evaluate a degree of accuracy of the machine-learning model based at least in part on the one or more similarity measures.

* * * * *